US012260000B2

(12) United States Patent
Kirti et al.

(10) Patent No.: US 12,260,000 B2
(45) Date of Patent: Mar. 25, 2025

(54) SYSTEMS AND METHODS FOR DYNAMICALLY GRANTING ACCESS TO DATABASE BASED ON MACHINE LEARNING GENERATED RISK SCORE

(71) Applicant: TrustLogix, Inc., Mountain View, CA (US)

(72) Inventors: Ganesh Kirti, San Jose, CA (US); Srikanth Sallaka, Fremont, CA (US); Deepak Chittoornallapareddy, Mountain View, CA (US); Kamalendu Biswas, San Ramon, CA (US)

(73) Assignee: TrustLogix, Inc., Mountain View, CA (US)

( * ) Notice: Subject to any disclaimer, the term of this patent is extended or adjusted under 35 U.S.C. 154(b) by 254 days.

(21) Appl. No.: 17/805,840

(22) Filed: Jun. 7, 2022

(65) Prior Publication Data
US 2022/0366078 A1 Nov. 17, 2022

Related U.S. Application Data

(63) Continuation-in-part of application No. 17/092,179, filed on Nov. 6, 2020, now abandoned.

(60) Provisional application No. 63/197,937, filed on Jun. 7, 2021, provisional application No. 62/931,697, filed on Nov. 6, 2019.

(51) Int. Cl.
*G06F 21/62* (2013.01)
*G06N 5/022* (2023.01)

(52) U.S. Cl.
CPC ........ *G06F 21/6245* (2013.01); *G06N 5/022* (2013.01)

(58) Field of Classification Search
CPC ...... G06F 21/60; G06F 21/62; G06F 21/6218; G06F 21/6245; G06N 5/02; G06N 5/022
See application file for complete search history.

(56) References Cited

U.S. PATENT DOCUMENTS

| | | | | |
|---|---|---|---|---|
| 2009/0198697 A1* | 8/2009 | Bilger | ................ | G06F 21/6227 707/999.009 |
| 2014/0372171 A1* | 12/2014 | Martin, Jr. | ......... | G06Q 30/0201 705/7.29 |
| 2017/0053076 A1* | 2/2017 | Lulla | ...................... | G06Q 40/08 |
| 2017/0091279 A1* | 3/2017 | Shah | .................. | G06F 21/6218 |
| 2019/0179799 A1* | 6/2019 | Barday | ................ | H04L 67/568 |
| 2020/0302074 A1* | 9/2020 | Little | .................. | G06F 21/6218 |

(Continued)

*Primary Examiner* — D'Arcy Winston Straub
(74) *Attorney, Agent, or Firm* — KPPB LLP

(57) ABSTRACT

Systems and methods for restricting access and visibility to sensitive personal data during ingestion and storing within a data repository are disclosed. In one embodiment, a process for determining whether to grant access to protected data includes defining risk thresholds for predetermined data access patterns of a data repository, monitoring new data access patterns to build a security data profile based on quantifiable characteristics as risk factors, receiving a second request for data from a client device at the data repository, determining if any access control policies applies to the second request generating a risk score for the second request for data based on the security data profile, determining whether to grant access to the second request for data based upon at least one applicable access control policy and the risk score, and providing the requested data in response to the second request for data when access is granted.

9 Claims, 18 Drawing Sheets

(56) References Cited

U.S. PATENT DOCUMENTS

2021/0097024 A1\* 4/2021 Miller ................ G06F 16/1824
2021/0133350 A1 5/2021 Kirti et al.

\* cited by examiner

Privacy Preservation Policies

| Name | Description | Target Process | Attribute | Protection Type | Action |
|---|---|---|---|---|---|
| Employee Analytics | Anonymize employee name | CI/CD data cloning job | employee_name | Anonymize | View I Edit |
| Data Sharing | Mask email id | AWS data pipeline | email_id | Mask | View I Edit |
| Protect patient id | tokenize patient id | AWS Redshift | patient_id | Tokenize | View I Edit |
| Protect revenue data | Anonymize revenue data | Kafka stream | revenue_amount | Anonymize | View I Edit |
| Protect National Identifier | tokenize national identy | ETL/Calibra | national_identifier | Tokenize | View I Edit |

TrustLogix | Data Protection Policies

Data protection policies

| Name | Description | Template or | Target Data | Action |
|---|---|---|---|---|
| Administrator access controls | New IAM account creation controls | Default template | AWS global | View | Edit |
| User data access controls | AWS Data Lake S3 | Custom | Data lake/S3 | View | Edit |
| Over privileges | Auto detect overly granted | Default template | All Data sources | View | Edit |
| Redshift Access to S3 | Ensure read-only access to S3 | Default | Redshift Cluster | View | Edit |
| AWS Glue Data Catalog Access | Ensure encryption and access | Default | Redshift Cluster | View | Edit |

▲ Privacy Protection
▲ Data Protection
▶ Security policies
▶ Remediation alerts
▲ Administration

Fig. 7

Copyright © 2019 TrustLogix Inc.

Data access w/o granular access

| Client Id | Book Id | Quantity | Company | Price | Trade Date | CUSIP | Ticker | Industry Sector |
|---|---|---|---|---|---|---|---|---|
| 43123 | 1578 | 2000 | ABC Corp | 100,000 | 30-Dec-2019 | OAS1234 | ABCK | Financial |
| 1212 | 1578 | 1000 | Hifi Bank | 110,000 | 20-Feb-2020 | ABC234D | DFG | Financial |
| 43123 | 1579 | 5000 | Healthcare | 48,000 | 12-Jan-1986 | ASF3456 | HMI | Funds |
| 1212 | 1540 | 10000 | Muni Bond | 136,000 | 28-Jun-1965 | ODF456 | TRVB | Government |
| 1134 | 1341 | 100 | Nextgen AI | 55,000 | 05-Mar-1948 | W234SFS | NAIL | High tech |
| 43123 | 1540 | 750 | Flyby | 142,000 | 23-Aug-1955 | A234TGF | FLBY | Transportation |
| 1245 | 1342 | 1000 | GM | 190,000 | 10-May-1957 | NZ34ASD | GM | Manufacturing |
| 43123 | 1341 | 3000 | Bobcat | 220,000 | 20-Sep-1934 | V678ASD | BBCT | Manufacturing |

Restrict data access based on an industry sector

Policy: Financials sector manager can only see trade data for Financial sector

| client_id | Book_id | Quantity | Company | Price | Trade Date | CUSIP | Industry Sector |
|---|---|---|---|---|---|---|---|
| 43123 | 1578 | 2000 | ABC Corp | 100,000 | 30-Dec-2019 | OAS1234 | Financial |
| 1212 | 1578 | 1000 | HiFi Bank | 110,000 | 20-Feb-2020 | ABC234D | Financial |
| 43123 | 1579 | 5000 | Healthcare | 48,000 | 12-Jan-1986 | ASF3456 | Funds |
| 1212 | 1540 | 10000 | Muni Bond | 136,000 | 28-Jun-1965 | OD6456 | Government |
| 1134 | 1341 | 100 | Nextgen AI | 55,000 | 05-Mar-1948 | WZ345F5 | |
| 43123 | 1540 | 750 | Flyby | 142,000 | 23-Aug-1955 | A234TGF | |
| 1245 | 1342 | 1000 | GM | 198,000 | 10-May-1957 | N234ASD | |
| 43123 | 1341 | 3000 | Bobcat | 220,000 | 20-Sep-1934 | V678ASD | |

```
┌──────────────────┐
│   Define risk    │  1702
│ threshold for data│
│ access patterns  │
└──────────────────┘
         │
         ▼
┌──────────────────┐
│   Monitor data   │  1704
│  access to build │
│   data profile   │
└──────────────────┘
         │
         ▼
┌──────────────────┐
│  Send new data   │  1706
│  access request  │
│   from client    │
└──────────────────┘
         │
         ▼
┌──────────────────┐
│ Receive new data │  1708
│ access request at│
│cloud data platform│
└──────────────────┘
         │
         ▼
      ◇ Grant new data ◇  1710
        access request?
         │ Yes
         ▼
┌──────────────────┐
│ Grant/deny new   │  1712
│  data access     │
│    request       │
└──────────────────┘
```

Fig. 17

SYSTEMS AND METHODS FOR DYNAMICALLY GRANTING ACCESS TO DATABASE BASED ON MACHINE LEARNING GENERATED RISK SCORE

CROSS-REFERENCE TO RELATED APPLICATIONS

The current application claims priority to U.S. Provisional Application No. 63/197,937, entitled "Systems and Methods for Dynamically Granting Access to Database Based on Machine Learning Generated Risk Score", to Kirti et al., filed Jun. 7, 2021, the current application is also a continuation-in-part of U.S. patent application Ser. No. 17/092,179, entitled "Systems and Methods for Automated Securing of Sensitive Personal Data in Data Pipelines" to Kirti et al., filed Nov. 6, 2020, which claims priority to U.S. Provisional Application No. 62/931,697, entitled "Systems and Methods for Automated Securing of Sensitive Personal Data in Data Pipelines", to Kirti et al., filed Nov. 6, 2019, the disclosures of which are incorporated herein by reference in their entirety.

BACKGROUND OF THE INVENTION

The explosion of data, and in particular sensitive personal data, generated and used by businesses is tempered in part by a need to track and secure the data. Personal data can include personally identifiable information (PII). One definition of PII provided by the U.S. General Services Administration is "information that can be used to distinguish or trace an individual's identity, either alone or when combined with other personal or identifying information that is linked or linkable to a specific individual. Sensitive data as discussed herein may also include information considered confidential.

Data, typically including many different types of personal data, flows across many entities on networks used by consumers and enterprises, such as mobile devices, servers, and cloud services. Due to the increasing value and centralization of personal data, external actors constantly attempt to hack into datastores of personal data and malicious organization insiders may take advantage of unauthorized use of personal data. Banks, credit card providers, retailers and even social networks are among many companies that have been sued and held liable for data breaches no matter the security measures that were in place.

The growing concern over data breaches birthed a number of data privacy and security standards. For example, regulations such as the US Health Insurance Portability and Accountability Act (HIPAA), California Consumer Privacy Act (CCPA) in California, General Data Protection Regulation (GDPR) in the European Union, Lei Geral de Proteção de Dados (LGPD) in Brazil place requirements on business which collect and process personal data. This can include rules over the type of data that may be collected, the level of control that a consumer has over that data, and the technical measures that must be taken to secure the data. There are also organic efforts by consumer advocacy organizations to advance public interest in requiring organizations to be responsive to customer queries and audits of personal data collections and usage.

Companies may often store data in their own cloud or the cloud of a service provider. The "cloud" has come to represent a conglomerate of remotely hosted computing solutions and the term "cloud computing" can refer to various aspects of distributed computing over a network. Various service models include infrastructure as a service (IaaS), platform as a service (PaaS), software as a service (SaaS), and network as a service (NaaS). A "cloud" can also refer to the data store and/or client application of a single service provider. Cloud applications connect a user's device to remote services that provide an additional functionality or capability beyond what is available solely on the device itself.

Typically, companies perform manual processes to safeguard the personal data on their systems, whether hosted on their own network or in a cloud. Security policies govern how personnel roles may access personal data and technical barriers (e.g., encryption) to the data. The security policies are often implemented manually by system administrators modifying settings on individual databases and/or interface systems. Changes to policies or requests to policies often result in the necessity of manual approvals and system configuration.

BRIEF DESCRIPTION OF THE DRAWINGS

Figure 6:
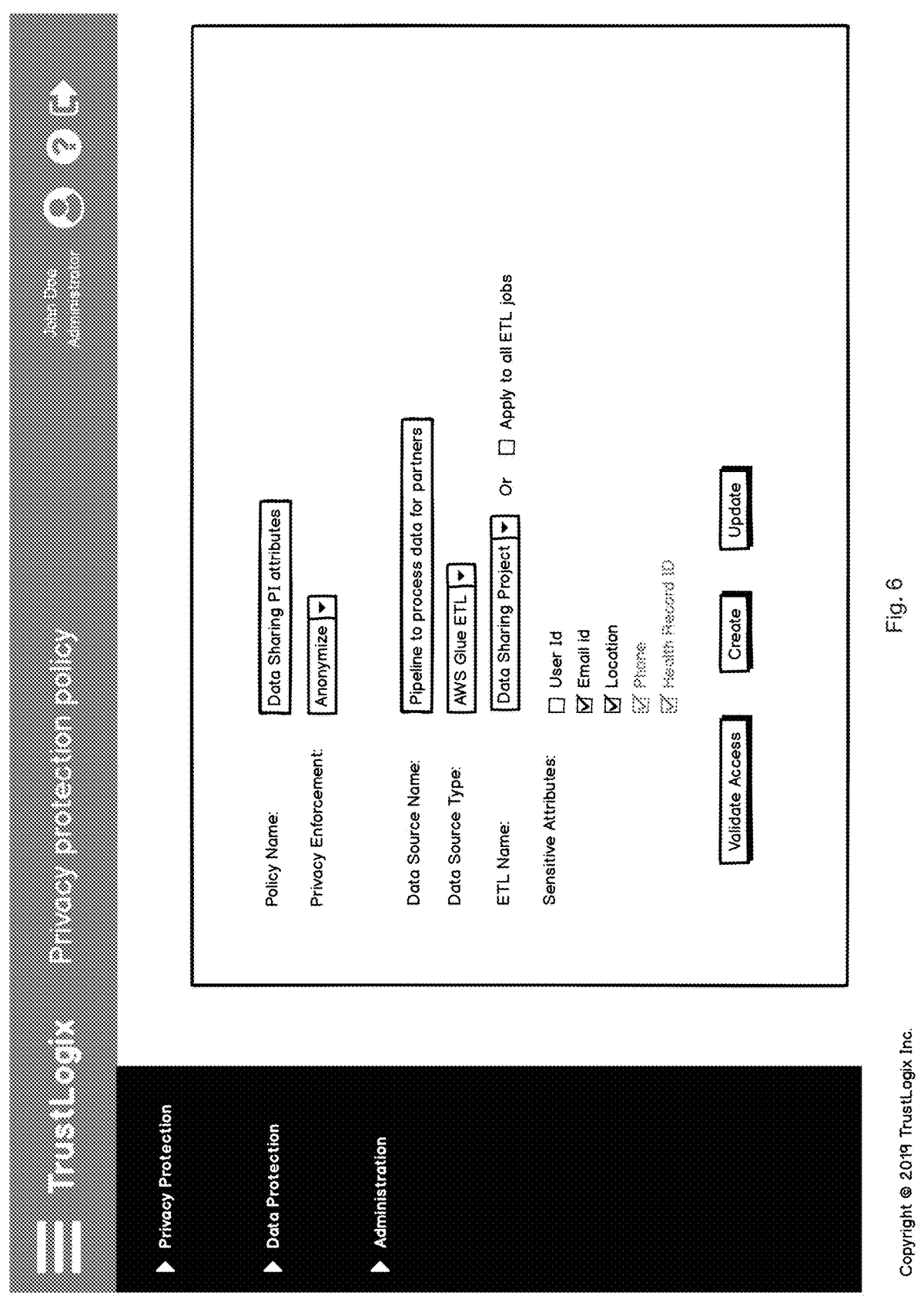

FIGS. 3-8 are graphical user interface screens showing various features and capabilities of a personal data protection system in accordance with several embodiments of the invention.

FIGS. 9-12 conceptually illustrate a user's access to data and the effects of access control policies and privacy policies in accordance with several embodiments of the invention.

FIG. 17 illustrates a process for determining whether to grant access to data by a client device based on risk scores in accordance with embodiments of the invention.

DETAILED DISCLOSURE OF THE INVENTION

Figure 1:
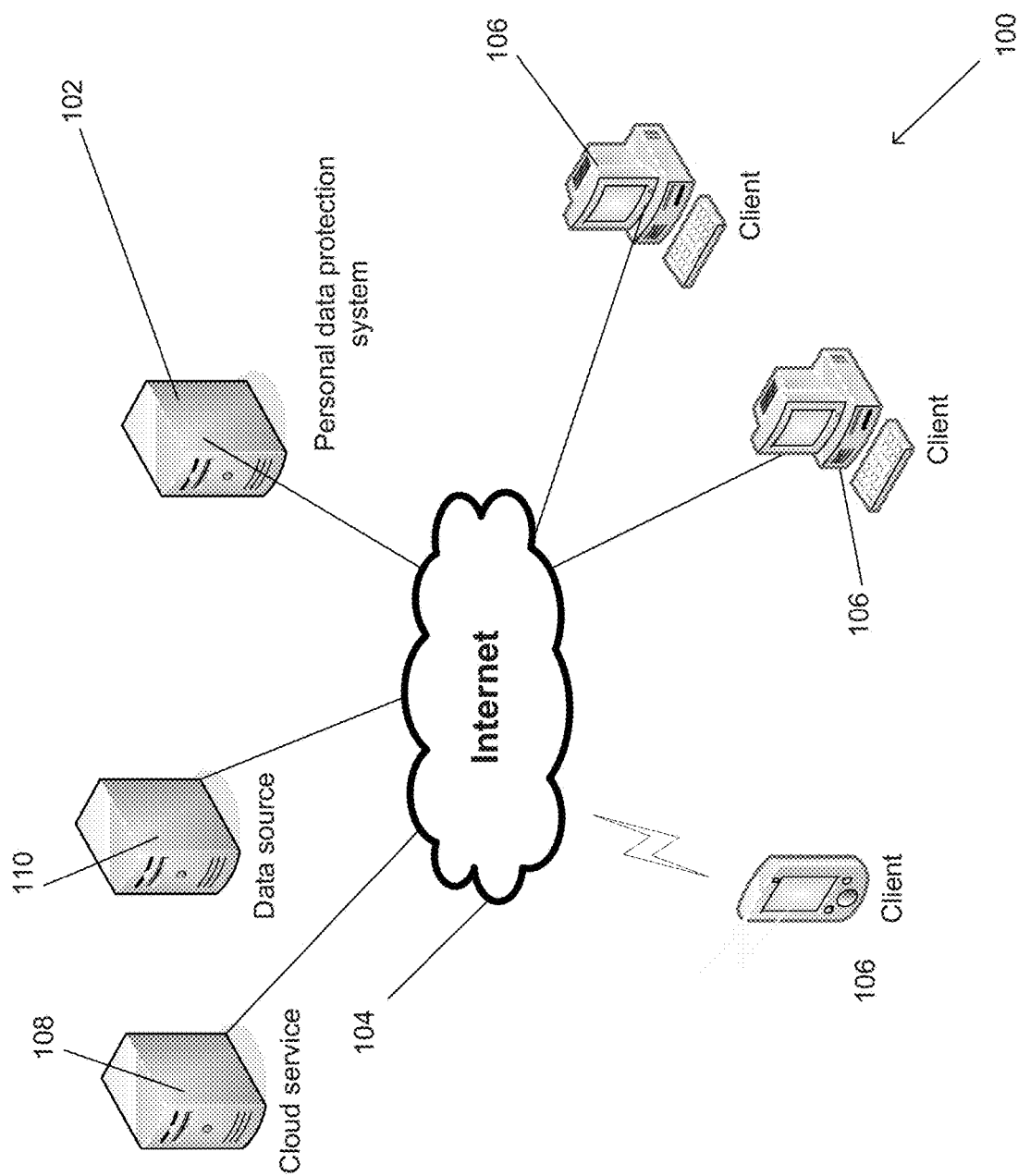
FIG. 1 is a system overview illustrating devices and cloud application service providers that can interact with a personal data protection system in accordance with several embodiments of the invention.

Turning now to the drawings, systems and methods for autonomously enacting data security policies in accordance with embodiments of the invention are disclosed. A paradigm utilized in modern data processing is ETL (Extract, Transform, Load)—referring to stages involved in moving raw data from sources, which can be referred to as data lakes, to data warehouse(s) and/or file(s) where applications can be run against the data. Some examples of services that can provide data lakes and other data processing tools are Amazon Web Services, Google Cloud Platform, and Microsoft Azure, as well as others. Examples of types of databases that may be used as data warehouses are Relational Database Management System (RDBMS), NoSQL, and other database architectures suitable for large and/or distributed datasets. While specific terms may be used below, one skilled in the art will recognize that concepts would be applicable to other cloud services, architectures, and database formats as appropriate to a particular application. Moreover, multiple cloud services may be utilized in a system simultaneously to service users using different services.

Existing systems typically are not equipped to secure personal data as may be required during ETL. Many challenges for a data management entity to effectively and efficiently keep sensitive data protected before release into target environments include: disparate data pipeline tools for working with data through ETL stages, different privacy regulations that must be adhered to, and third-party intrusion threats.

In many embodiments of the invention, a single management system and user interface can provide an automated data solution with enforcement of security and privacy embedded in the data layer. Features of the management system can track which data is sensitive and secure this data from the early discovery stages through transformation and loading into databases. As discussed further above, enterprises collecting data are often hindered by a complex data ecosystem in handling multiple data pipeline tools and across multiple cloud services to process and share data. Embodiments of the invention can provide a simple and efficient solution by providing a single central management system for governance of protecting sensitive personal data through all the disparate data pipeline systems. The central management system can identify and secure sensitive personal data in the various data pipelines, while presenting a uniform interface to a user and providing services in an automated hands-off manner. An objective in many embodiments of the invention is to maintain personal data that is stored "at rest" in a protected form (e.g., encrypted) so as to stay in compliance with government regulations concerning data privacy.

In some embodiments, the system can be implemented as Saas (software as a service). In other embodiments, the system can be embedded at a single tenant. The system may be implemented using infrastructure tools available to automated web services. Suitable tools can include, but are not limited to, AWS Glue and Lambda for Amazon Web Services, Kafka plugin for Kafka, and Jenkins for CI/CD (continuous integration/continuous deployment) data ops.

Additional embodiments of the invention provide for access control that can grant or deny access to data by particular users based on a dynamically generated risk score. The dynamic operation can improve beyond traditional static access controls by accounting for multiple factors at the time of the access request. Such factors can also be adaptive by providing context about the sensitivity of the data. As such, these approaches can be more scalable than traditional access controls and policies.

In many embodiments of the invention, a system for data security includes applications executing on one or more hardware platforms, user interface components displayed by one or more hardware platforms, and data warehouses stored on one or more hardware platforms. Such hardware platforms may include at least a processor and non-volatile memory containing instructions directing the processor to perform processes such as those discussed further below.

System Architecture for Personal Data Protection Systems

A system for securing personal data in accordance with embodiments of the invention can include multiple components that may be located on a single hardware platform or on multiple hardware platforms that are in communication with each other. Components can include software applications and/or modules that configure a server or other computing device to perform processes for personal data protection in accordance with embodiments of the invention as will be discussed further below.

A system including a personal data protection system 102, client devices 106 that can be used to access the personal data protection system 102, one or more cloud services 108, and one or more data sources 110 in accordance with embodiments of the invention is illustrated in FIG. 1. The system 100 can include a number of different types of client devices 106 that each has the capability to communicate over a network. The client devices 106 may communicate with the personal data protection system 102 and present a user interface (e.g., web or application interface) for interacting with the service. The personal data protection system 102 may communicate with cloud application services 108 and/or data sources 110 to retrieve and process personal data as will be discussed further below. In many embodiments of the invention, at least some of the personal data is obfuscated (e.g., by encryption) or depersonalized. In several embodiments of the invention, the processed personal data is stored on the personal data protection system or in another data repository. For example, the processed personal data may be stored in one or more cloud service 108. In some embodiments, all of the personal data is stored in the same repository. In other embodiments, portions of the personal data are stored on one repository while other portions are stored on other repositories.

Figure 1C:
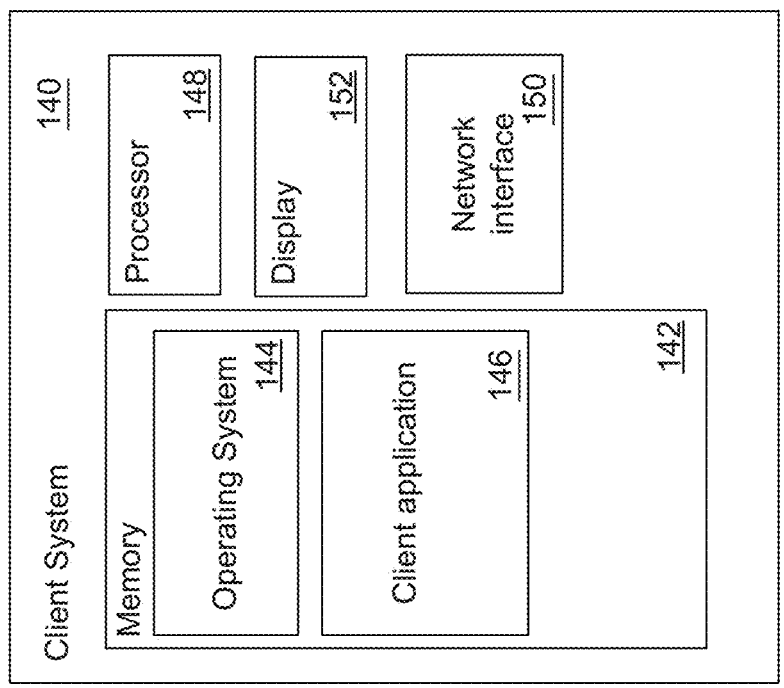
Fig. 1C conceptually illustrates a client system in accordance with an embodiment of the invention.
Figure 1B:
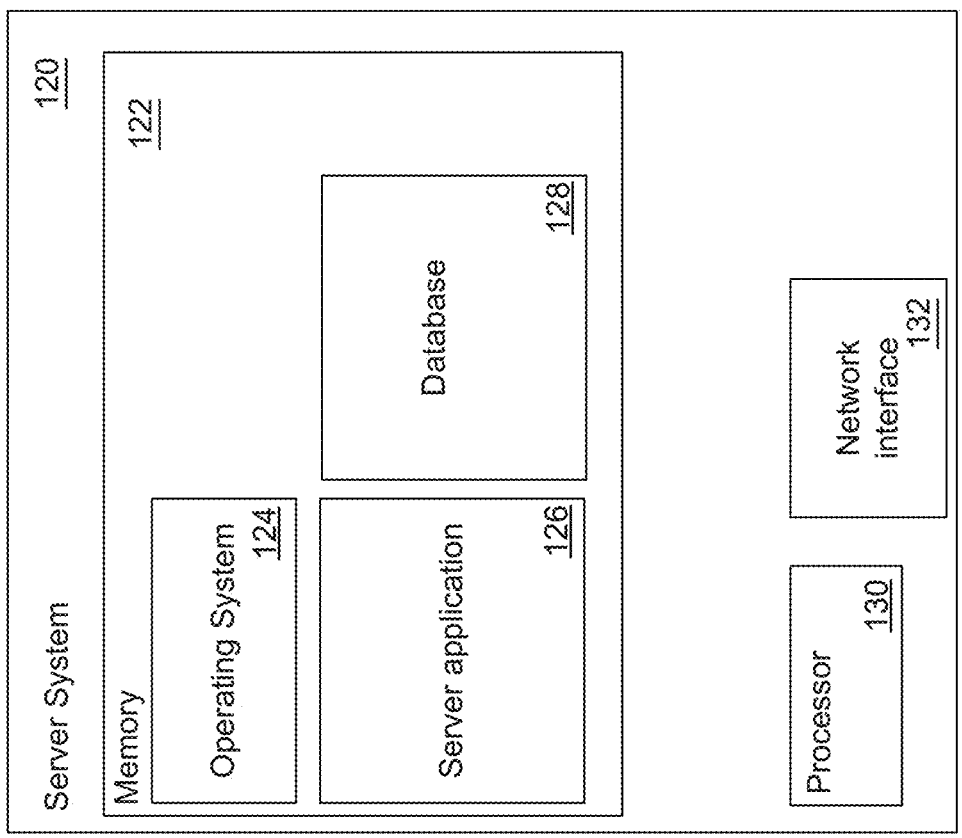
Fig. 1B conceptually illustrates a server system in accordance with an embodiment of the invention.

A server system in accordance with an embodiment of the invention is conceptually illustrated in FIG. 1B. The server 120 includes memory 122 having an operating system 124, a server application 126. Certain embodiments may also include a database 128. It also includes a processor 130 and network interface 132. The server application 126, when executed, can configure processor 130 to perform processes such as those described further below. The server system architecture may be utilized to implement any of computing devices such as those that make up a cloud service, a data source, or a personal data protection system.

A client system in accordance with an embodiment of the invention is conceptually illustrated in FIG. 1C. The client system 140 includes memory 142 having an operating system 144 and a client application 146. It also includes a processor 148 and a network interface 150. Certain embodiments may also include a display 152. The client application 146, when executed, can configure processor 148 to perform processes such as those described further below.

One skilled in the art will recognize that any of a variety of configurations may be utilized in accordance with embodiments of the invention to retrieve, process, and store personal data using a personal data protection system.

User Roles

Users associated with an organization may have user accounts that grant some kind of access to data in a database or other type of datastore (e.g., within a cloud). Levels of permissions and/or access may be granted to an individual user account based on a user role assigned to the user account. User roles can be in the form of template profiles that specify rules governing what data may be accessed and can be assigned to specific user accounts, for example, based upon their intended usage of the system (e.g., organizational/employment responsibilities).

Two categories of user roles can include data consumer role and administrator role. Data consumer roles can include for example, but are not limited to, data scientist, business intelligence analyst, and/or business user. A user acting as a data scientist may have the responsibility to build models such as machine learning models for fraud detection, customer engagement, or other similar operations. A data scientist role may thus have access to customer data and third-party data. A user acting as a business analyst may have the responsibility of identifying customer usage patterns. A business intelligence analyst may thus have access to customer data sources. A user acting as a business user may have the responsibility for executing trades for customers. A business user role may thus have access to trading data based on entitlements.

Data administrator roles can include for example, but are not limited to, data engineer and information security/data protection officer. A user acting as a data engineer may have the responsibility to build datasets for various teams within an organization. A data engineer user role may thus have full access to data pipelines or other sources of raw data.

Although specific user roles and associated permissions and access are discussed above, one skilled in the art will recognize that any of a variety of user roles and associated permissions and access may be utilized in accordance with embodiments of the invention.

Processes for Securing Personal Data in Data Pipelines

Figure 2:
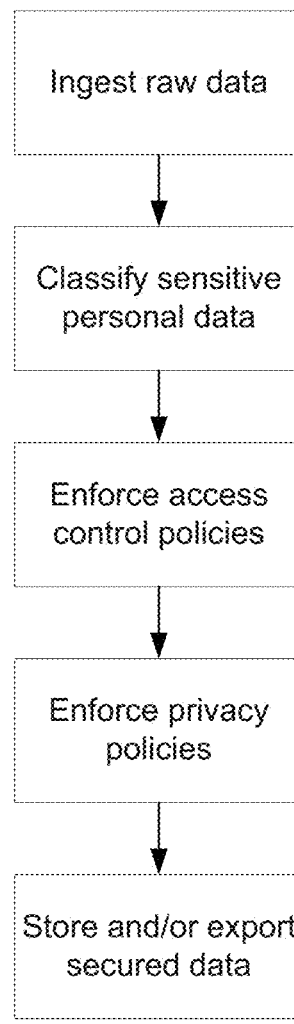
FIG. 2 is a flow chart illustrating a process for securing personal data while retrieving it from data sources in accordance with several embodiments of the invention.
Figure 3:
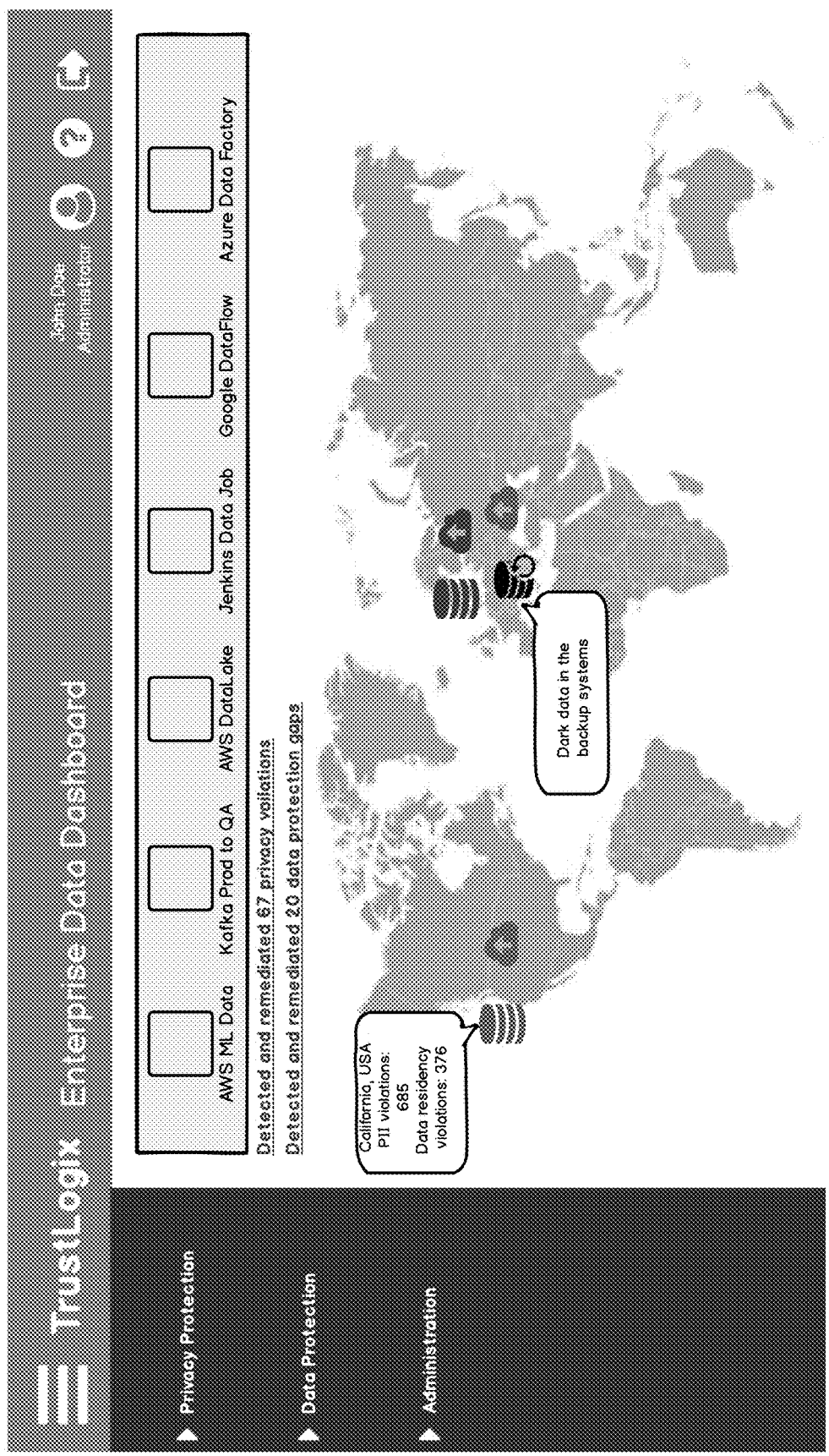
Figure 4:
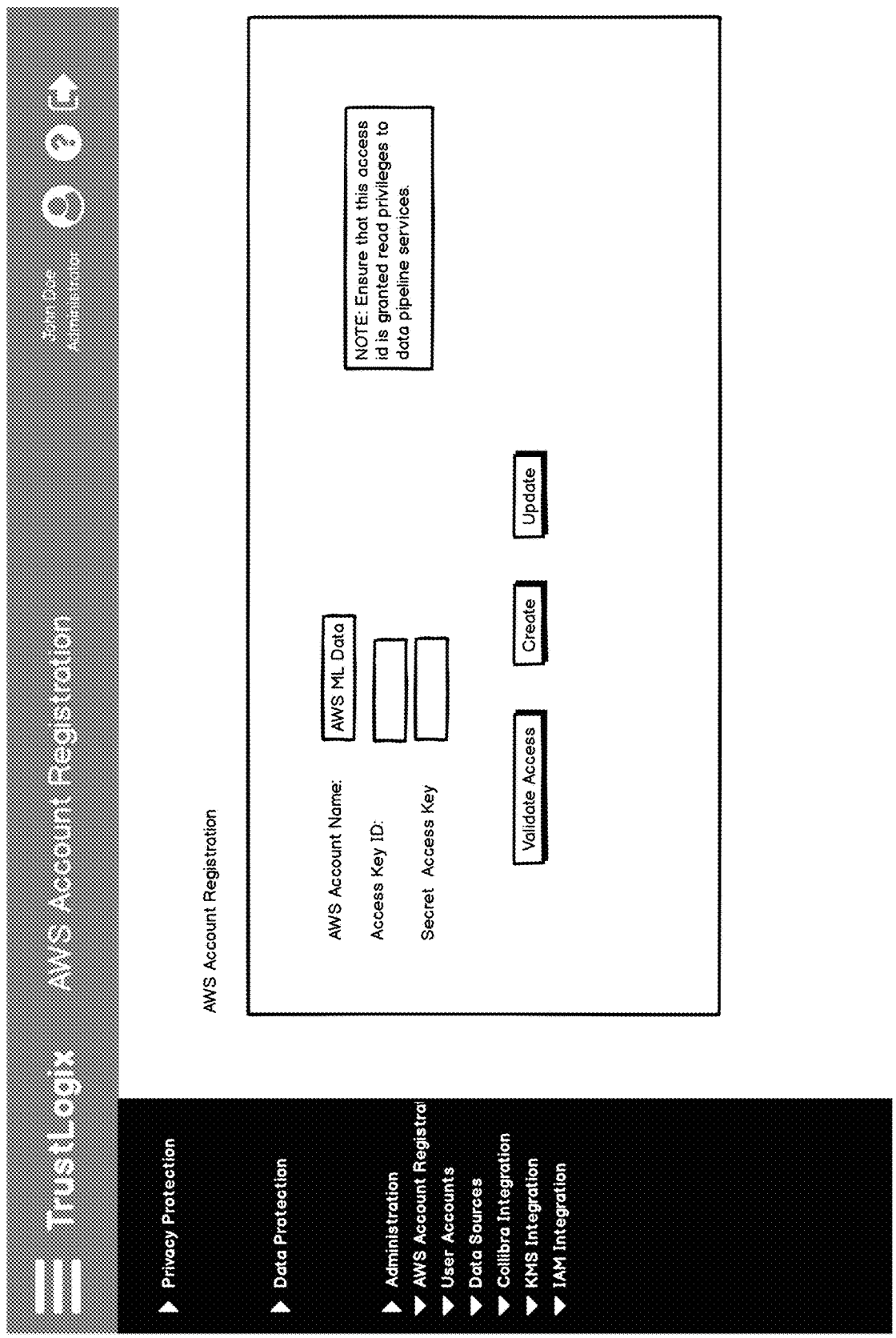
Figure 8:
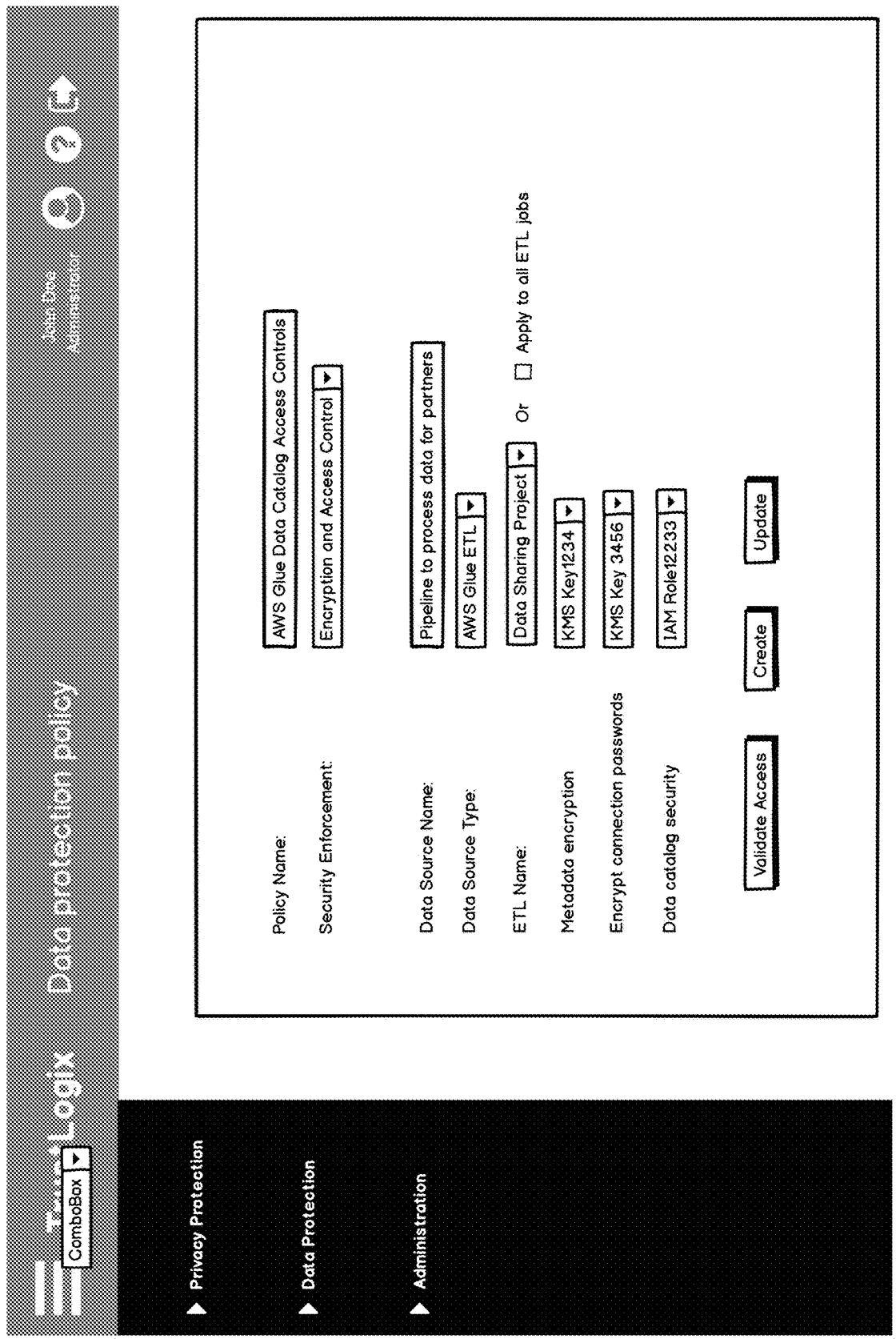

A process for protecting sensitive personal data in data streaming architectures in accordance with embodiments of the invention is illustrated in FIG. 2. The process 200 includes retrieving and analyzing (202) raw data from at least one data source. This can be embedded in a data processing pipeline, for example, in-line with ETL processing. In several embodiments, the process may also include collecting the raw data using one or more data discovery tool(s) and/or performing some processing on the raw data to prepare it for entry into a data repository or a cloned data repository. For example, data may be normalized or transformed to another format (e.g., a common format) so that data from different sources may be combined. Data can be prepared from types of data pipelines such as, but not limited to, data lakes, Kafka, and/or CI/CD data ops jobs. Other data sources can include, but are not limited to, Amazon Redshift, Amazon EMR, Databricks, AWS Glue, Snowflake, PostgreSQL, and Microsoft SQL Server. Further embodiments of the invention include receiving login credentials or otherwise authorizing a personal data protection system to access data from a particular data source using a particular account.

The process identifies and/or classifies (204) pieces of data that contain sensitive personal information. The classification of personal data can include classifying into different levels and/or categories to comply with one or more data privacy or data security standards. The process can identify fields or parts of data that are sensitive and/or include personal or personally identifiable data. Some embodiments utilize one or more data catalog services, such AWS Glue or Collibra, to create a catalog of personal attributes (e.g. metadata). The data catalog can be used to generate or refine data privacy policies such as those discussed below and/or to improve detection of sensitive personal information in newly received raw data. In further embodiments, machine learning is utilized to refine the classification of personal data over time. In some embodiments, the classification is triggered by receipt of new raw data at the data source. In other embodiments, it can be a manual trigger to analyze existing data.

The process enforces (206) at least one access control policy and/or at least one data privacy (208) policy on the raw data. The access control policies can specify rules which user roles and/or specific user accounts are permitted to access certain categories of sensitive personal data once it is entered into the data repository. The data privacy policies can specify rules for how certain categories of sensitive personal data are securely stored in the data repository. If no data privacy policy is stored or a new policy is desired, it can be created. Data privacy policies can include compliance policy templates that aim for compliance with privacy standards (such as, but not limited to, HIPAA, CCPA, GDPR, etc.), custom templates created by a user, and/or data obfuscation templates (to apply techniques such as, but not limited to, encryption, tokenization, etc. to sensitive data).

Enforcing an access control policy can include setting the permissions of one or more user accounts in the system. The permissions may be restricted in ways such as granting access only to certain types or categories of personal data or to personal data that is obfuscated or depersonalized. A set of permissions may be saved as a template that can be referred to as a user role that represents a type of position that may be suitable to other users in that position. In some embodiments of the invention, the creation or defining of access control policies can be asynchronous or separate from the data ingestion (e.g., ETL process) from a data source. Access control policies are discussed in greater detail further below.

Enforcing a data privacy policy can include obfuscating personal data in some way, such as encryption (e.g., multi-party compute) and/or depersonalization (e.g., masking, pseudo-anonymization, tokenization, differential privacy, MPC, etc.). Several embodiments of the invention utilize event-driven computing services, such as AWS Lambda, to impose the policies on the data pipeline. Services such as AWS Lambda may be serverless in that code is not necessarily written for execution on specific servers. Other embodiments may utilize other mechanisms to implement policies that are less abstract and are bound to specific machines. In many embodiments of the invention, defining the parameters of a privacy policy can be asynchronous or separate from data ingestion (e.g., ETL), while enforcement of the privacy policy is performed during data ingestion from a data source. Data privacy policies are discussed in greater detail further below.

The resulting dataset (210), protected by restricted access and obfuscation, can be referred to as secured data. Secured data can be safely viewed by consumers, or used for other purposes such as analytics, machine learning models, and/or third parties with reduced privacy concerns. In some embodiments of the invention, the secured dataset is stored in a separate data repository. In other embodiments it can be stored in the original data repository, either replacing and deleting the original data or alongside the original data. The original data and the secured data may have different access permissions according to the data privacy policies. In some embodiments of the invention, the system may maintain an intermediate copy of the dataset that is not fully processed through obfuscation as stage data that can be used for other purposes. Although a specific process is discussed above with respect to FIG. 1, one skilled in the art will recognize that any of a variety of processes may be utilized in accordance with the invention. The remaining figures illustrate various implementation configurations in different environments according to additional embodiments.

In several embodiments, the process involves management by a monitoring and observability service that can provide data activity notification events, such as AWS Cloudwatch. The monitoring and observability service can coordinate event handling and trigger features such as those that transform sensitive data into a more secure form. It can also coordinate events such as those discussed above with respect to detecting raw data to be processed and forming or updating a catalog of data attributes. A management console as a user interface can provide visibility into the data flows, policies, and other aspects of the system as well as configurability by a user. Additional embodiments of the invention include reporting services to provide reports on data classification, data compliance, data authorization, data privacy, and/or audit. FIGS. 3-8 illustrate example screens of a management console in accordance with some embodiments of the invention.

In still further embodiments of the invention, the system can generate trust scores for data pipelines, where the trust score indicates a level of security of the data pipeline. The trust score can be assigned based on factors including, but not limited to, sensitiveness of the data flowing through the data pipeline and activity by devices or users. A trust score can provide information relevant to taking actionable steps, such as reconfiguring security policies or permissions.

Establishing User Account Access Controls

Typically, in data systems that are set up without any controls a user may access all data in a dataset without restrictions. This is often not be desirable as discussed above because of privacy and regulatory issues. An example of an unrestricted user account and some data it may access in a table are illustrated in FIG. 9. In the illustrated example all data in the table may be accessed by the business user account.

Figure 10:
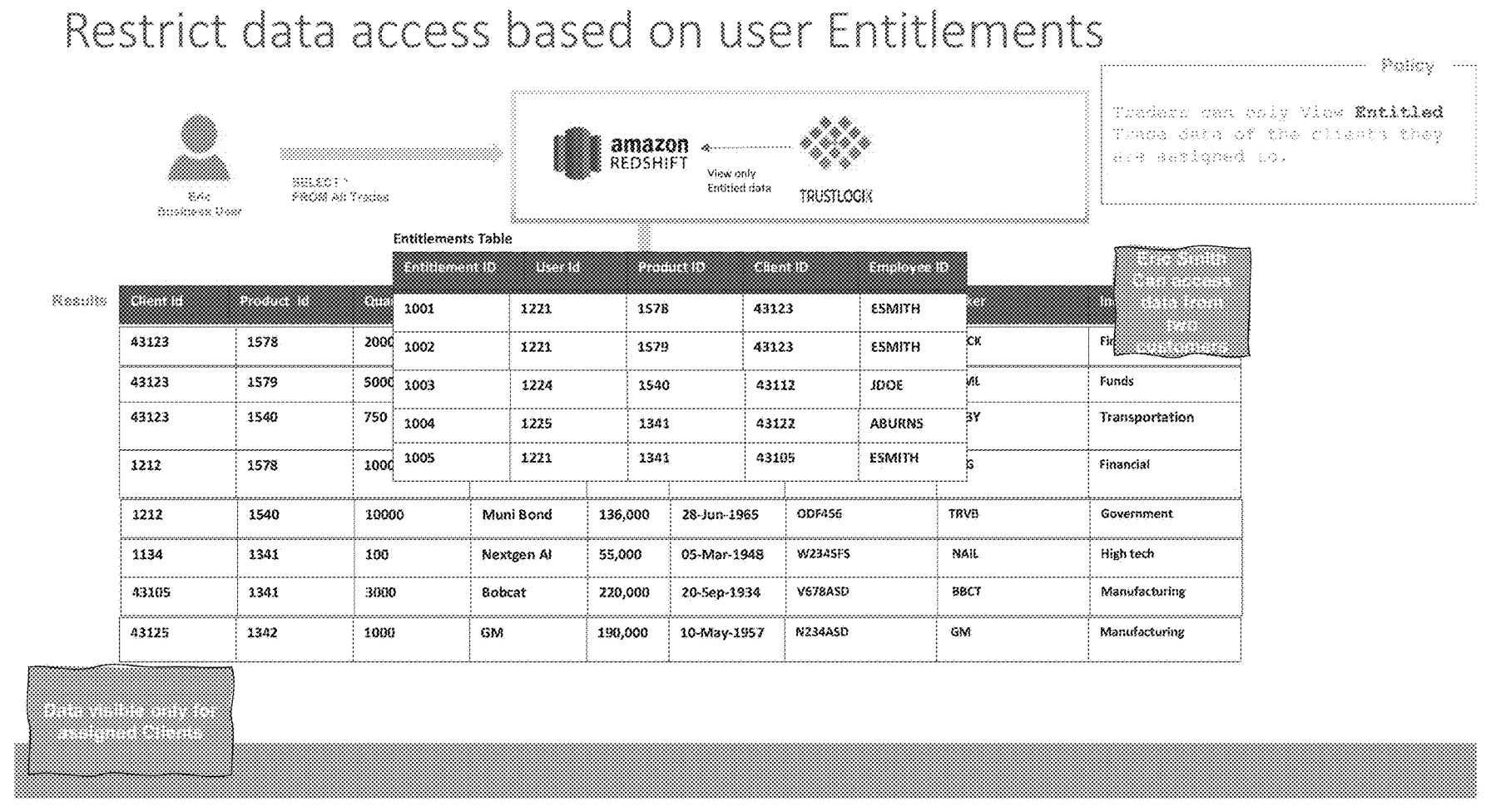

In certain embodiments of the invention, data access controls can be enforced by user entitlements. Entitlements can be in the form of rules that are specified in a lookup table called an entitlements table. An example in accordance with an embodiment of the invention is illustrated in FIG. 10. Entitlement identifiers 1001, 1002, and 1005 permit employee identifier ESMITH to only access two clients 43123 and 43105 with product identifier 1578, 1579, and 1341 and no other data. In some embodiments of the invention, an access policy may filter data that is accessible to a user by comparing one or more resource attributes in the data with user attributes. As an example, referring to FIG. 11 an access control policy is illustrated where the user may view data for the financial sector (i.e., the data has a resource attribute value of "financial"). The policy may be further modified by other attributes, such as geographic region.

Figure 12:

Some access control policies may allow access to data but obscure some part of the data that may be sensitive. An example in accordance with an embodiment of the invention is illustrated in FIG. 12. The customer data is accessible except some fields, such as customer social security number, may be masked so that the value is not visible. While some examples of access control policies are described above, one skilled in the art will recognize that any of a variety of policies may be instituted in a personal data protection system in accordance with embodiments of the invention.

Privacy Policies

As discussed further above, a privacy policy can include obfuscating personal data in some way, such as encryption (e.g., multi-party compute) and/or depersonalization (e.g., masking, pseudo-anonymization, tokenization, differential privacy, MPC, etc.) in accordance with embodiments of the invention. Certain types of information that may have privacy policies applied can include, but are not limited to, social security numbers, credit card numbers, addresses, birth dates, and/or other types of sensitive personal information. The information can be obfuscated by encrypting it, so that only certain user accounts may access it. In many embodiments of the invention, the personal data protection system does not keep encryption keys to the data, but leaves them in the domain of the customer cloud system.

In some embodiments, the sensitive information can also be masked, so that the visibility is limited for certain user accounts. For example, it can be obfuscated to a generic non-unique format so the information is not de-identifiable (the association with a particular person recovered). As an example, masking may be appropriate for bank account numbers associated with customers. A policy may specify that bank account numbers should be masked for all user roles. In some embodiments, sensitive information can be tokenized, so that the data is encrypted but can be de-identified. An example list of categories of protected information and protection type in accordance with an embodiment of the invention is shown in FIG. 5 and a configuration screen shown in FIG. 6. As can be seen in the illustrated examples, some types of information such as employee name and revenue data may be anonymized. Some types of information such as email identifier (ID) may be masked. Additional types of information such as patient ID and national ID may be tokenized. One skilled in the art will recognize that various embodiments of the invention may utilize any of a variety of types of information may be protected by a variety of methods not limited to the techniques described.

Implementation Form Factors

Figure 13:
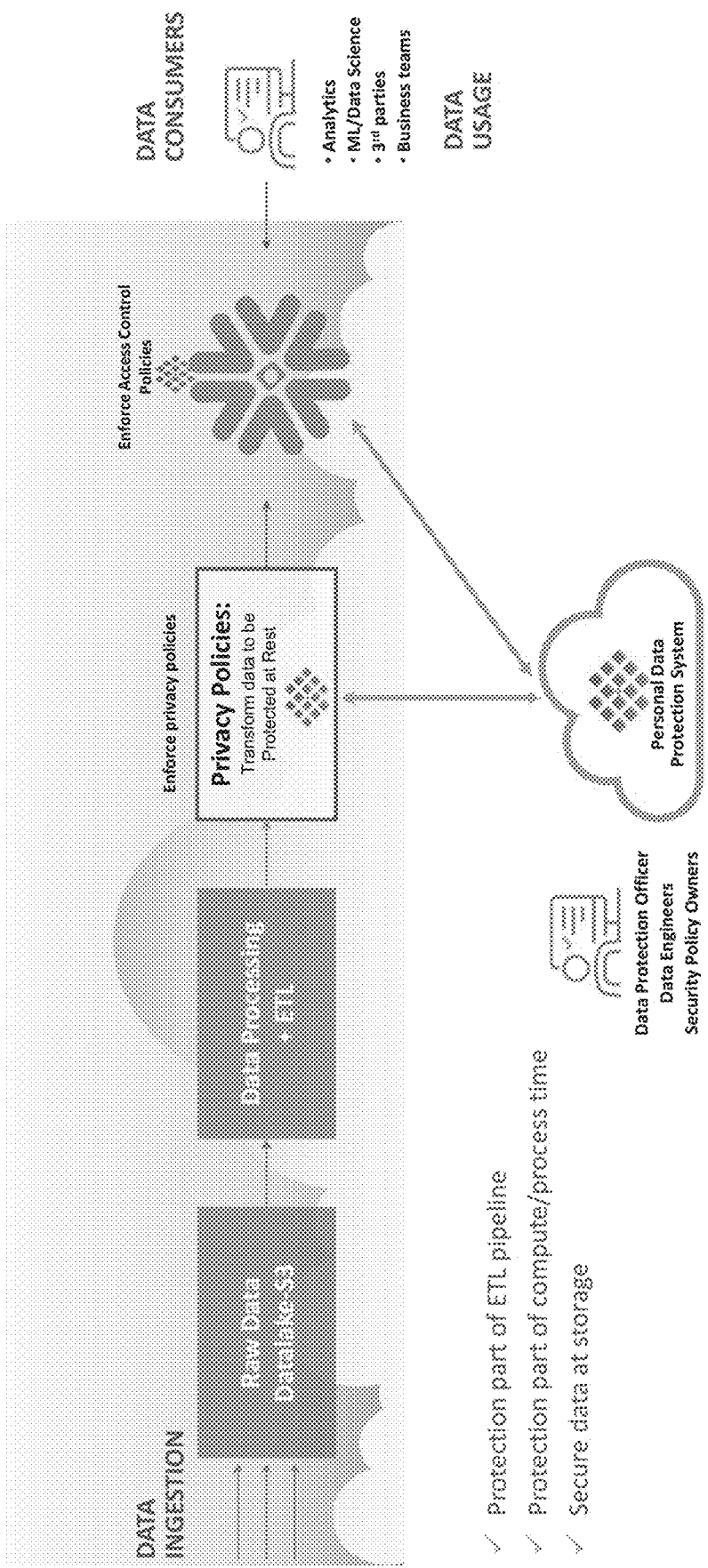
FIG. 13 illustrates a process for securing personal data in accordance with embodiments of the invention.

The processes for personal data protection discussed above with respect to certain embodiments of the invention can be generalized as shown in FIG. 13. As mentioned above, personal data protection systems and associated processes in accordance with embodiments of the invention may be implemented as software-as-a-service (SaaS) system. Access control policies and privacy policies may be combined into a package referred to as a trustlet. In some embodiments, the trustlet is within a customer organization's cloud system. It may use highly secure private links referred to as transit gateways to connect to one or more data repositories in the customer organizations cloud system. It may also communicate with a front-end interface system at a SaaS control plane.

Figure 14:
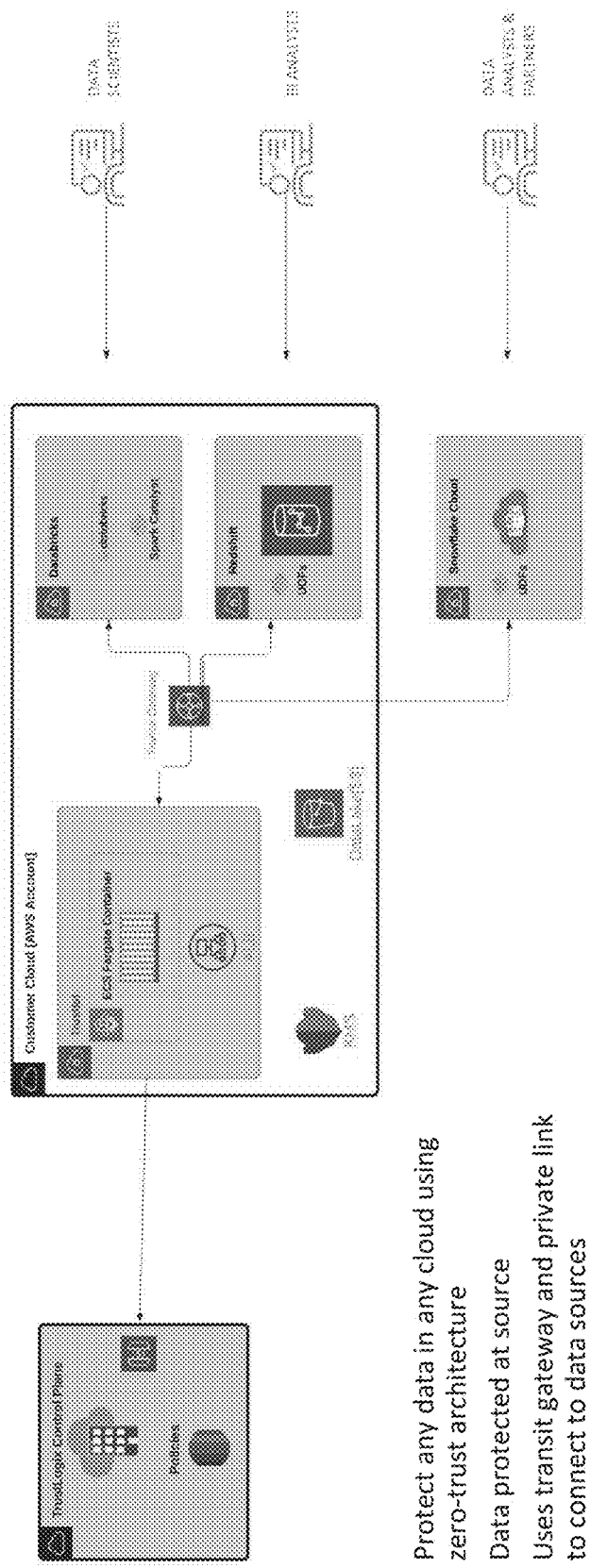
FIG. 14 illustrates a system diagram for implementing a personal data protection system in accordance with some embodiment of the invention.

A personal data protection system configured with a trustlet in this manner according to some embodiments of the invention is illustrated in FIG. 14. As can be seen in the figure, privacy and/or access control policies can be created and/or configured using an interface at a control plane. The control plane may communicate with or control a trustlet within a customer cloud. The trustlet may retrieve data from and/or enforce policies on cloud data repositories such as instances of Databricks, Redshift, and/or Snowflake that are within or external to the customer cloud. In other embodiments of the invention, the trustlet may reside in the SaaS control plane and connect to the customer organization's data repositories remotely. One skilled in the art will recognize that other configurations may be implemented in accordance with embodiments of the invention as appropriate to a particular application.

Regulatory Compliance and Risk Scores

Systems and methods described above that secure data at the source can enable data owners to have greater control over the data, and delivers actionable insights while streamlining data security and privacy operations. Such platforms can provide data usage monitoring and help identify security vulnerabilities, and then enable the enactment of access control policies to secure data within cloud data platforms, including cloud data warehouses such as Snowflake and RedShift, as well as data pipelines, data lakes, and analytics (e.g., business intelligence) platforms.

Figure 15:
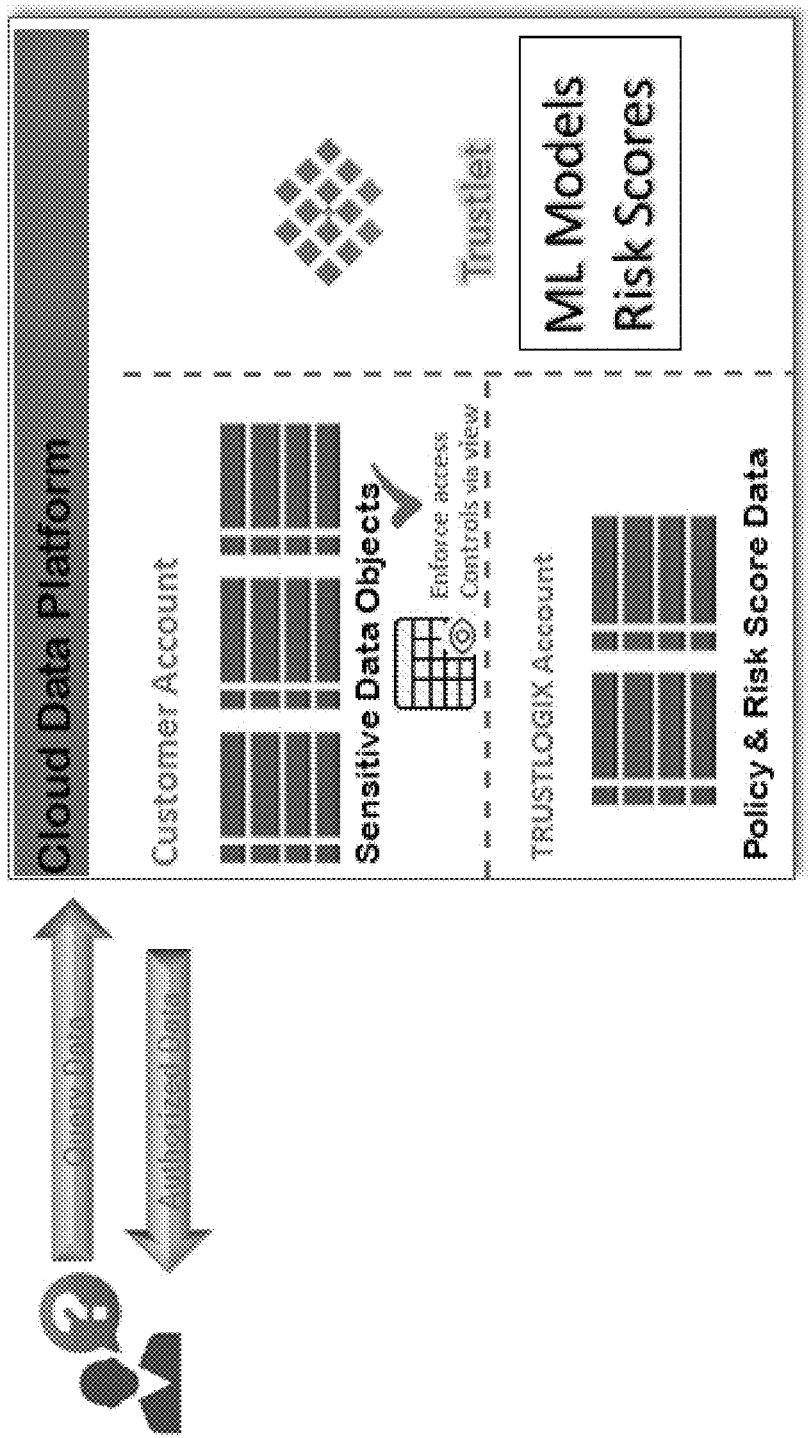
FIG. 15 illustrates an example of enforcing access using risk scores in accordance with embodiments of the invention.

In further embodiments of the invention, advanced security features can include detecting potential compliance violations, such as, but not limited to, SoD (Separation of Duties) and SOX (Sarbanes-Oxley), in real time. Processes such as those discussed below can be implemented, for example, using trustlets as discussed above as a security service within a cloud data platform (e.g., AWS, Azure, etc.). An example of enforcing access using risk scores in accordance with embodiments of the invention is conceptually illustrated in FIG. 15.

For example, the concept of user roles that may be assigned to individual user accounts is discussed further above. For example, in certain embodiments two user roles may be defined in the system as a purchaser role and an approver role. These may be associated with a purchasing or buying department within an organization, where the approver role approves of purchases that a purchaser role proposes. A rule in the system may be that any user account cannot be assigned both roles of purchaser and approver (e.g., they must be different user accounts associated with different people).

Other roles and/or security or privacy policies such as those described further above or other policies can be included in a library of policies for assessing risks. For example, additional policies can restrict certain users'/roles' access to data (to only certain subsets of data, user cannot have a particular other role, a role can only be used between certain hours, a role has a lower level of access, etc.). SoD and SOX violations can be defined as policies in the library. Policies in the risk assessment library, can be provided as feedback to a risk assessment machine learning model as supervised contextual information. It can also consider security metadata concerning roles (e.g., what privileges and policies apply, etc.) and users (e.g., what group they belong to, what network they are accessing from, etc.), which can be obtained, for example, using Spark DataFrames. Usage metadata concerning normal patterns of legitimate access by users can also be provided as training data to the risk assessment machine learning model.

The risk assessment machine learning model can generate risk scores for roles and/or user accounts that reflects a level of risk associated with the role or user account (e.g., due to violations of SoD or SOX or other policies). Risk scores can be updated by running the model on a continuous basis at regular intervals using updated data.

Upon a next access of the cloud data platform by a particular user account at a client device (e.g., running a query), the current risk score of the user account and/or a role associated with the user account can be evaluated. A security function, such as, but not limited to, an extension function of a database engine (e.g., Secure View or User Defined Function in RedShift, MySQL, etc.) can be used to regulate the user account's access to data. Access can be dynamically determined using the current risk score or combination of risk score of the user account and one or more role(s) associated with the user account. Other logic may also be considered in the determination of whether to grant access. For example, additional factors can include the user's device configuration (e.g., what client tool they are using, operating system version, etc.), what IP address the user is accessing from (e.g., is it a suspicious address), or what are the sensitive data objects to be accessed by the user (is it personally identifiable information or other). As will be discussed further below, processes in accordance with additional embodiments of the invention can utilize additional factors to generate risk scores that may be utilized to determine whether to grant or deny access to particular data that is requested.

Access Controls by Role

Different access control policy models may be incorporated into embodiments of the invention. For example, models can include, but are not limited to, Role Based Access Control (RBAC), Access Control List (ACL), and/or Attribute Based Access Control (ABAC), etc. In these models, a Principal (Users or Role) can be provisioned access to data by defining a set of static rules to control what a user is authorized to perform on various data sets. For example, an access control policy may specify that a "Trader" role can be granted access to customers' transaction data. This policy can be enforced regardless of any other conditions that could potentially increase the risk factor.

Processes for Generating Risk Scores and Granting Access

Figure 16:
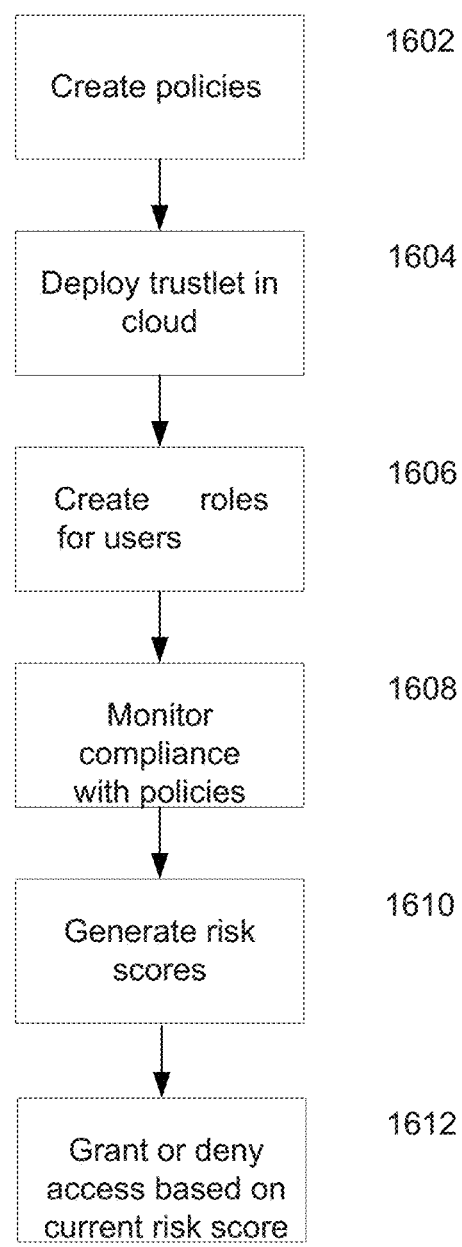
FIG. 16 illustrates a process for generating risk scores using machine learning and dynamically granting access to data based on risk scores in accordance with embodiments of the invention.

A process for generating risk scores using machine learning and dynamically granting access to data based on risk scores in accordance with several embodiments of the invention is illustrated in FIG. 16. The process 1600 includes creating (1602) access control, privacy, and/or regulatory policies. Access control, privacy, and regulatory policies that may be utilized in accordance with embodiments of the invention are described and can be implemented as discussed further above.

A trustlet can be deployed (1604) as service within a cloud data platform, such as a cloud data warehouse. One or more roles are created (1606) that govern the usage of a user account and can be associated with a user account are created for the cloud data platform.

The trustlet monitors (1608) roles and privileges based on the implemented policies. Risk scores for one or more user accounts and/or one or more roles can be generated (1610) using a risk assessment machine learning model and may utilize information collected by the trustlet. The risk assessment model can leverage techniques such as, but not limited to, Ensemble Learning Algorithms, to continuously build a new profile called "DataAccess Profile" using the data collected by the trustlet. Risk scores can be updated on an ongoing basis (e.g., at predetermined intervals) using current information.

When a client device using a particular user account attempts to access data (e.g., using a query) in the cloud data platform, the request is captured by a security function. The security function determines (1612) whether to grant or deny access based on the current risk score of the user account and/or current risk score of one or more roles associated with the user account.

Although a specific process is described above with respect to FIG. 16, one skilled in the art will recognize that any of a variety of processes may be utilized in accordance with embodiments of the invention. A process for accessing data by a client device is discussed below with reference to FIG. 17.

The process includes defining (1702) thresholds or acceptable risk levels for various data access patterns that would be performed on the cloud data platform. Data access patterns can include access by client devices of data or other cloud data platform resources. These patterns can incorporate factors such as, but not limited to identities of client devices, geographic locations of client devices, the type(s) of data that is accessed or requested, the owner(s) of data that is accessed or requested, etc.

The process includes monitoring (1704) data access patterns performed by client device(s) on the cloud data platform and building a security data profile that incorporates data centric risk factors that can include quantifiable characteristics of the requested access such as, but is not limited to, the following:

security classification of data being accessed (e.g., levels or categories of the requested data as discussed further above)

governance compliance and regulation violations (e.g., separation of duties, etc.)

identification of tools used to access the data (software application and version, client device hardware platform, etc.)

geographic location data is accessed from (location of the accessing client device)

whether security follows the least privilege model (limits users' access rights to only what are strictly required to perform their assigned duties)

The risk factors can be quantified and may also be scaled to represent lower and higher risk at each end of the valid range of values.

The process 1700 can include sending (1706) a subsequent data access request from a client device using a particular user account to the cloud data platform. The request to access data is received (1708) by the cloud data platform. The cloud data platform determines (1710) whether to grant or deny the subsequent data access request by applying any applicable access control policies and comparing the dynamic risk score to the predetermined threshold risk levels. If the role of the user account is permitted by all applicable access control policies and the dynamic risk score does not meet the threshold, then access is granted (1712). If the role is not permitted by any access control policy or the dynamic risk score meets a threshold, then access is denied (1712).

Additional remediation measures to that denial of access can include blocking the client device and/or user account from making further requests. As discussed further above, data may be stored across multiple cloud data platforms, and therefore the determinations above can incorporate factors from the different cloud data platforms. Furthermore, decisions whether to grant or deny access can be applied across the different cloud data platforms.

Although a specific process for granting and denying data access requests is described above with respect to FIG. 17, one skilled in the art will recognize that any of a variety of processes may be utilized in accordance with embodiments of the invention.

Example Data Risk Score Access Patterns

Overly granted access—Typically, in enterprise data systems a Superuser role is provisioned to set up and configure the data system. To avoid conflict of interest, users with these special roles should not be allowed to access or manipulate classified or confidential data within the system. The cloud data platform can monitor for role assignments that violate this rule and elevates risk score for any data transactions that involve sensitive data and users with this matching condition.

Separation of duty—Governance and compliance regulations may dictate that any business specific roles assigned to users should not raise a conflict of interest. For example, a data scientist should not have the permission to manipulate the raw data.

Privacy sensitive data accessed by unapproved tools or unauthorized geolocations—A security best practice is to categorize all sensitive and crown jewel data assets within the data platform. To ensure that appropriate protection of these data sets, the cloud data platform can monitor for tools that are accessing these datasets and increase a risk profile when an unapproved tool is used to access the data. Similarly, if the sensitive data is accessed from unauthorized geolocations the risk profile can be elevated and thus the access is denied.

Quiet period policy for public company—A quiet period policy (e.g., under securities law) may mandate strict guardrails on what "confidential" data can be accessed or shared. The cloud data platform can elevate the risk profile of the confidential data during this time period dynamically to block access to this data.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for dynamically restricting access to data stored within a data repository, the method comprising:
   defining risk thresholds for predetermined data access patterns of the data repository using a personal data protection system;
   monitoring, using the personal data protection system, new data access patterns of the data repository to build a security data profile based on quantifiable characteristics as risk factors, where data access patterns include at least one request for data within a data repository and identification of data requested by the request for data, and where the quantifiable characteristics include:
   security classification of requested data;
   governance compliance and regulation violations;
   identification of tools used for the request for data;
   geographic location of origin of the request for data;
   receiving a second request for data from a client device at the data repository;
   determining if any access control policies applies to the second request for data using the personal data protection system;
   generating a risk score for the second request for data based on the security data profile using the personal data protection system;
   determining whether to grant access to the second request for data based upon at least one applicable access control policy and the risk score using the personal data protection system;
   providing, by the data repository, the requested data in response to the second request for data when access is determined to be granted; and
   blocking the client device from accessing the requested data when access is determined to not be granted.

2. The method of claim 1, wherein one or more access control policies comprises maintaining an entitlement list that specifies what data a user account may access based upon one or more attributes of the data matching predetermined attributes associated with the user account.

3. The method of claim 1, wherein enforcing one or more access control policies comprises obscuring visibility of certain attributes of personal data by a user account.

4. The method of claim 1, wherein the personal data protection system resides within an instance of a cloud service where the data is stored and utilizes VPC to VPC (virtual private cloud) peering and private secure links to enforce the at least one applicable access control policy.

5. The method of claim 1, further comprising sending an error message to the client device when access is determined to be denied.

6. The method of claim 1, further comprising blocking the client device from making further requests for data when access is determined to be denied.

7. The method of claim 1, wherein security classification of requested data includes levels that are defined to comply with one or more data privacy standards.

8. The method of claim 1, wherein security classification of requested data includes levels that are defined to comply with one or more data security standards.

9. The method of claim 1, wherein identification of tools used for the request for data includes identification of at least one software application and identification of at least one hardware component.

\* \* \* \* \*